United States Patent [19]

Spisak

[11] 4,183,587
[45] Jan. 15, 1980

[54] WHEEL AND HUBCAP ASSEMBLY

[76] Inventor: Edward G. Spisak, 35700 Oakwood Ln., Westland, Mich. 48185

[21] Appl. No.: 856,419

[22] Filed: Dec. 1, 1977

[51] Int. Cl.² ............................................. B60B 7/06
[52] U.S. Cl. ........................... 301/108 R; 301/37 TP; 301/37 B
[58] Field of Search ............ 301/108 R, 108 A, 37 R, 301/37 TP, 37 B

[56] References Cited
U.S. PATENT DOCUMENTS

| | | | |
|---|---|---|---|
| 2,021,369 | 11/1935 | Lyon | 301/37 B |
| 2,053,710 | 9/1936 | Caenssle | 301/37 TP X |
| 2,220,340 | 11/1940 | Lyon | 301/108 R |
| 2,386,245 | 10/1945 | Lyon | 301/37 TP |
| 2,584,142 | 2/1952 | Lyon | 301/37 B |

Primary Examiner—Charles A. Marmor
Attorney, Agent, or Firm—Fisher, Gerhardt, Crampton & Groh

[57] ABSTRACT

A wheel and hubcap combination in which the wheel has an axially extending annular flange adjacent to its axis of rotation and in which a retaining portion on the hubcap engages the flange at a point close to the face of the wheel so that the lip of the cap engages bosses adjacent the wheel attaching nuts to maintain the hubcap in spaced relationship for insertion of a tool and removal of the hubcap from the wheel.

4 Claims, 5 Drawing Figures

U.S. Patent   Jan. 15, 1980   4,183,587
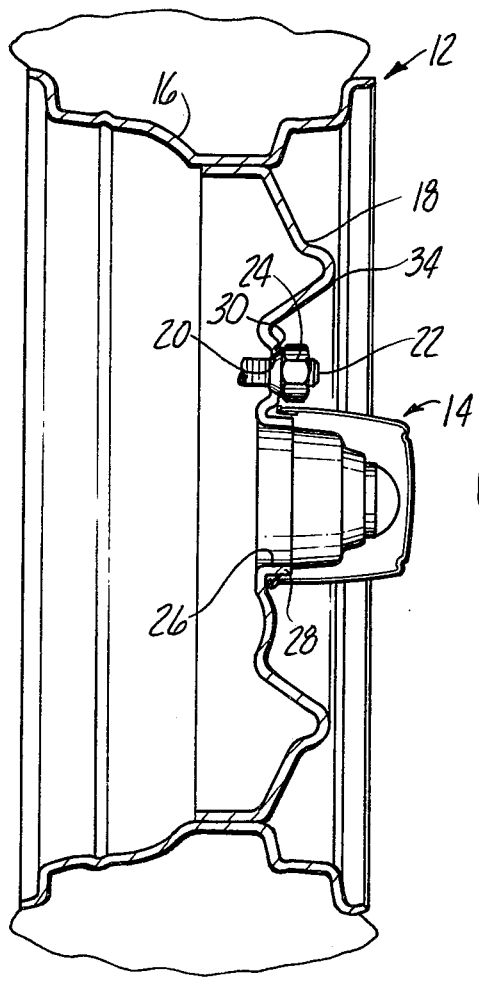
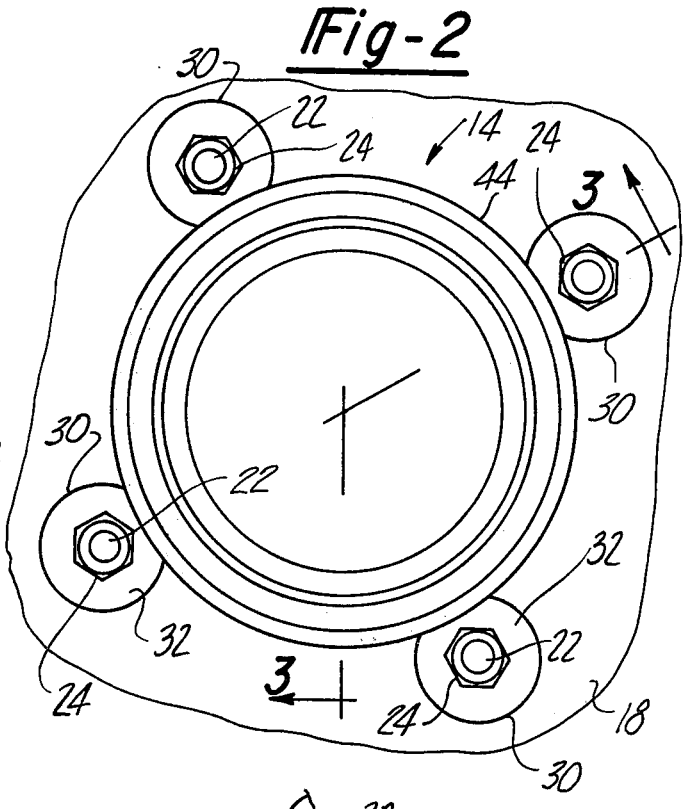
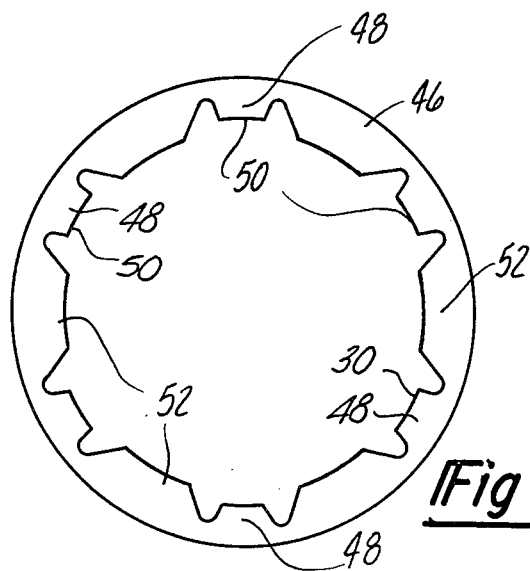
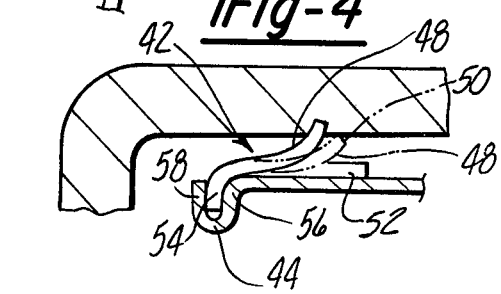

WHEEL AND HUBCAP ASSEMBLY

This invention relates to vehicle wheels and more particularly to a wheel and hubcap combination.

In some instances vehicle wheels are made in an effort to provide an ornamental and pleasing appearance without necessitating a wheel cover for the entire wheel. In such instances only the hub portion of the wheel requires ornamentation. This usually is provided for by means of an ornamental hubcap which presents problems of mounting in order to maintain the ornamental hubcap axially fixed relative to the wheel and so that the hubcap is mounted concentrically with the axis of rotation of the wheel.

It is an object of the invention to provide a hubcap which may be easily attached to a vehicle wheel in a manner retarding unintentional removal.

It is another object of the invention to provide a wheel and hubcap combination wherein the hubcap is attached by flexible means acting to center the hubcap relative to the axis of rotation of the wheel.

Another object of the invention is to provide a hubcap for a vehicle wheel wherein the hubcap has a lip portion which deflects resiliently and radially to assist in maintaining the hubcap in position relative to the wheel.

The wheel and hubcap combination of the present invention has a wheel with an axially extending flange and a hubcap with a retaining ring portion within the cup that bitingly engages the circumferential exterior of the flange to resist removal of the hubcap from the wheel. The retaining portion includes attaching portions which extend radially inwardly and axially outwardly to resist axial outward removal of the hubcap except with the use of a tool. Provision for receiving a tool is provided by forming the hubcap with a lip adjacent to its cup shaped opening to engage wheel portions spaced from the face of the wheel such as bosses for locating the nuts holding the wheel to the hub of the vehicle.

These and other objects of the invention will be apparent from the following description and from the drawings in which:

FIG. 1 is a cross-sectional view of a vehicle wheel and hubcap combination embodying the invention;

FIG. 2 is an elevation at an enlarged scale of a portion of the wheel and hubcap combination seen in FIG. 1;

FIG. 3 is a cross-sectional view taken on line 3—3 in FIG. 2;

FIG. 4 is a cross-sectional view at an enlarged scale of a portion of the structure seen in FIG. 3; and FIG. 5 is a view of an element prior to formation into a retaining ring for the hubcap.

Referring to the drawings, particularly to FIGS. 1 and 2, the wheel and hubcap assembly embodying the invention includes a wheel 12 and hubcap 14. The wheel 12 has a drop center, tire receiving rim 16 attached to a metal disc or spider 18. The spider 18 has a plurality of stud receiving openings 20 through which studs 22 can extend to receive nuts 24 to secure the wheel 12 to the hub of a vehicle in a conventional manner. The stud receiving openings 20 lie on an annular bolt circle spaced radially outwardly from an opening 26 in the wheel spider 18 to receive a hub or axle portion, not shown. The opening 26 is surrounded by an axially extending annular flange 28. Each of the stud openings 20 is formed in a pad or boss 30 which forms a surface 32 raised or extending axially outwardly a slight amount from the surrounding surface or face 34 of the spider 18. The spider 18 may be contoured to give a styled, attractive appearance.

The hubcap 14 includes a generally cup shaped cap 40 and an annular retaining portion 42 fastened within the cap 40 adjacent to its opening defined by an annular lip 44.

The retaining portion 42 is made from a relatively hard spring-like material whereas the cap portion 40 can be made of more decorative materials or from lower grade materials which are subsequently plated or painted.

The retaining portion 42 will be best understood by referring to FIG. 5 showing a flat stamping 46 which is subsequently formed to form the retaining portion 42. The stamping 46 includes a plurality of diametrically opposed attaching portions 48 each having a blade or edge portion 50. Disposed between adjacent attaching portions 48 are flange portions 52. During the formation of the retaining ring portion 42 the flange portions 52 are bent at substantially right angles to the outer portion of the ring 54 so that in the finish form the flange portions extend axially. The attaching portions 48 are bent first in the same direction as the flange portions 52 and then radially inwardly as best seen in FIG. 4.

The flange portions 52 are received within the cap 40 to engage the inner walls and to center the annular retaining ring relative to the cap 40. The annular radially extending flange portion 54 which is seen in FIG. 4, is in engagement with a radially outwardly extending flange 56 which limits axial inward movement of the retaining ring 42 relative to the cap 40. With the retaining ring 42 in position within the cap 40 an edge flange 58 is bent to engage the opposite face of the annular flange 54 of the retaining ring 42 so that the latter is prevented from moving axially outwardly from the cup shaped cap 40. The flanges 56 and 58 serve to form a radially extending lip 44 of the hubcap 14.

To attach the hubcap 14 to the wheel assembly 12, the cap is placed in axial alignment with the wheel and is moved radially inwardly so that the attaching portions 48 are deflected radially outwardly as shown in FIG. 4 from their full line position to their broken line position at which time the attaching portions 48 extend radially inwardly of the axis of the wheel and axially outwardly so that the blades 50 bitingly engage the annular flange 28 to resist axial displacement of the hubcap 14 from the wheel 12.

In attaching the hubcap 14 to the wheel 12, the hubcap 14 is displaced axially until the lip 44 comes into engagement with the bosses 30 as best seen in FIG. 3. In that position the edges 50 bitingly engage the annular flange 28 at a point very closely adjacent to the face surface 34 of the spider 18. Also, the engagement of the lip 44 with the bosses 30 insures that the lip 44 remains in slightly spaced relationship to the face 34 of the spider 18 so that a tool such as a screwdriver may be inserted between the lip 44 and wheel face 34 in the gap indicated at 60 in FIG. 3. Such gaps are formed between adjacent nuts 24. The tool may then be used to pry the hubcap 14 from the face of the wheel.

With the hubcap 14 in position on the annular flange 28 the attaching portions 48 act to resiliently center the cap 40 relative to the wheel 12. The deflection of the attaching portions 48 from their full line position to the broken line position as shown in FIG. 4 serves to forcibly urge the blade 50 into biting engagement with the flange 28. Although not visible in the drawings, the annular spacing of the attaching portions 48 allows the lip 44 to deflect radially outwardly a slight amount adjacent to the attaching portions 48 so that the tendency to return to the completely annular condition also exerts a force radially inwardly on the annular flange 28 to assist in retaining the hubcap 14 on the wheel 12.

A wheel and hubcap assembly have been provided in which a wheel with an outer face and a radially inner annular flange extending axially from the face of the wheel is provided with a cup shaped hubcap held in position relative to the annular flange by a retaining portion having circumferentially spaced attaching portions with blade or edge portions bitingly engaging the flange. The retaining portions act to resiliently center of the hubcap relative to the wheel and to resist axial displacement of the hubcap and wheel unless a tool is used to remove the cap. The attaching portions extend radially inwardly and axially outwardly to resist such axial displacement and the lip of the hubcap is placed in a particular relationship to the face of the wheel to afford a space to receive a tool for removal of the hubcap from the wheel.

The embodiments of the invention in which an exclusive property or privilege is claimed are defined as follows:

1. A wheel and hub cap assembly including a wheel having an outer face with a plurality of uniformly and circumferentially spaced mounting bosses adapted to receive and to engage wheel securing nuts, an annular flange extending axially from said face adjacent the axis of said wheel and radially inwardly of said mounting bosses, a cup-shaped cap having a radially extending lip at the opening of said cup, said lip forming a radially inwardly opening annular groove, a retaining member having a radially outwardly extending flange disposed in said groove, said retaining member having a plurality of uniformly spaced resilient attaching portions extending radially inwardly from said lip and axially outwardly from said face, each of said attaching portions having an edge to bitingly engage the radially outward exterior of said annular flange to resist axial displacement of said cap from said wheel, and said mounting bosses being raised axially from said face, said lip engaging said bosses when said attaching portions are in engagement with said axial flange to maintain said lip in predetermined spaced relationship to the face of said wheel at locations between said mounting bosses.

2. A wheel and hub cap assembly including a wheel having an outer face with a plurality of uniformly and circumferentially spaced mounting bosses adapted to receive and to engage wheel securing nuts, an annular flange extending axially from said face adjacent the axis of said wheel and radially inwardly of said mounting bosses, a cup-shaped cap having a radially extending lip at the opening of said cup, said lip forming a radially inwardly opening annular groove, a retaining member having a radially outwardly extending flange disposed in said groove, said retaining member having a plurality of uniformly spaced resilient attaching portions extending radially inwardly from said lip and axially outwardly from said face, each of said attaching portions having an edge to bitingly engage the radially outward exterior of said annular flange to resist axial displacement of said cap from said wheel, and said retaining member having axially extending flange portions formed intermediate said attaching portions, said axially extending flange portions being engageable with the interior walls of said cup to maintain said annular retaining member coaxialy with said cup.

3. The combination of claim 2 wherein said lip deflects radially outwardly upon engagement of said attaching portions with said axial flange to assist maintaining said cap in position on said wheel.

4. The combination of claim 2 wherein said lip prevents axial movement of said retaining member relative to said cup.

* * * * *